United States Patent
Berchtold et al.

[11] 3,872,741
[45] Mar. 25, 1975

[54] DIFFERENTIAL GEAR ASSEMBLY

[75] Inventors: Donald R. Berchtold; Charles F. Gebhardt, both of Decatur, Ill.

[73] Assignee: Caterpillar Tractor Co., Peoria, Ill.

[22] Filed: Aug. 8, 1973

[21] Appl. No.: 386,716

[52] U.S. Cl. .................................. 74/713, 74/711
[51] Int. Cl. ......................... F16h 1/40, F16h 1/44
[58] Field of Search ............................ 74/711, 713

[56] References Cited
UNITED STATES PATENTS

| | | | |
|---|---|---|---|
| 2,691,876 | 10/1954 | Wildhaber | 74/713 X |
| 2,865,229 | 12/1958 | Hodanek | 74/713 |
| 3,199,375 | 8/1965 | Rosen et al. | 74/713 |
| 3,330,169 | 7/1967 | Carrico et al. | 74/711 |
| 3,342,084 | 9/1967 | Randall | 74/711 |
| 3,512,430 | 5/1970 | Sutherland | 74/713 |

FOREIGN PATENTS OR APPLICATIONS
1,126,691  3/1962  Germany ............................ 74/711

*Primary Examiner*—Samuel Scott
*Assistant Examiner*—P. S. Lall
*Attorney, Agent, or Firm*—Phillips, Moore, Weissenberger, Lempio & Strabala

[57] ABSTRACT

A differential gear assembly for coupling an input shaft with a pair of driven axles includes a ring gear engaged with the input shaft, a differential housing secured to the ring gear and supporting a pair of axially spaced apart bevel gears which are coupled to the driven axles, a pinion assembly including two pinion gears meshing with the bevel gears with adjustable means controlling spacing therebetween, the pinion assembly being coupled for rotation with the differential housing and ring gear, the arrangement of the pinion gears maintaining proper meshing engagement with the bevel gears.

5 Claims, 3 Drawing Figures

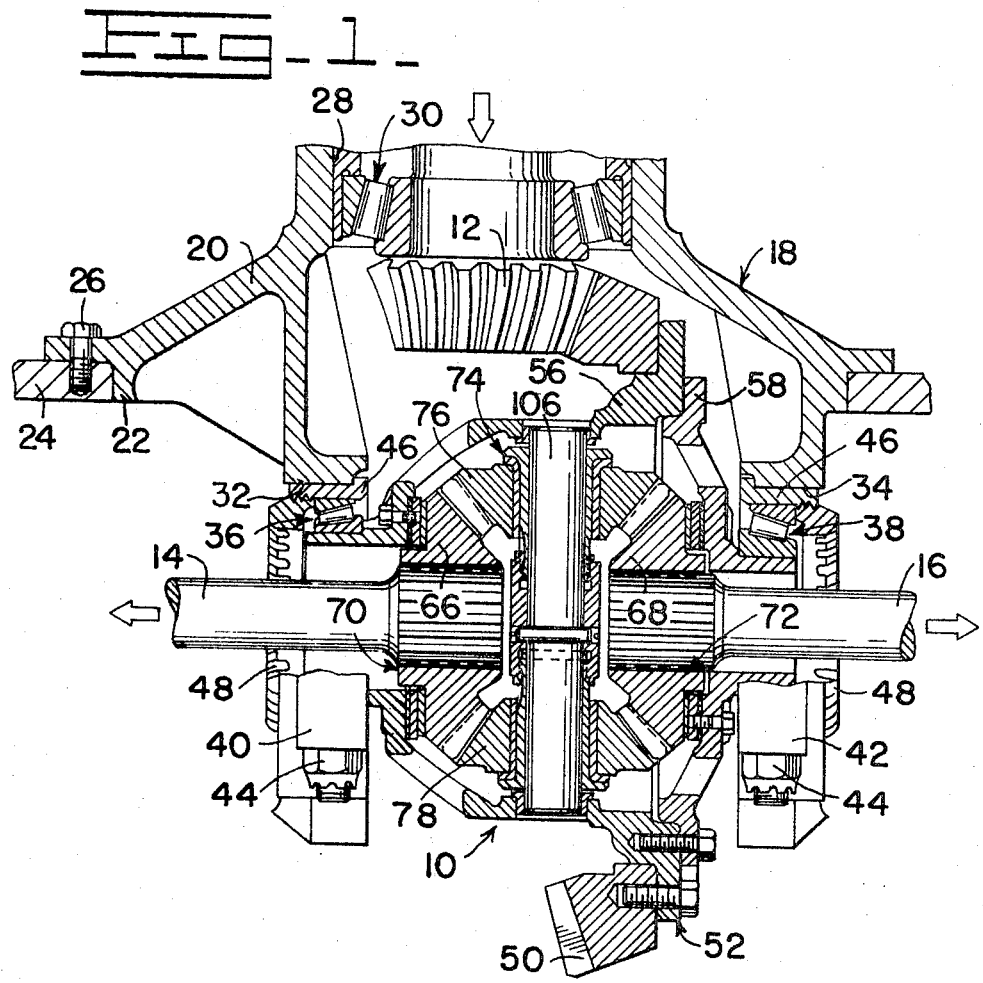
FIG-1-
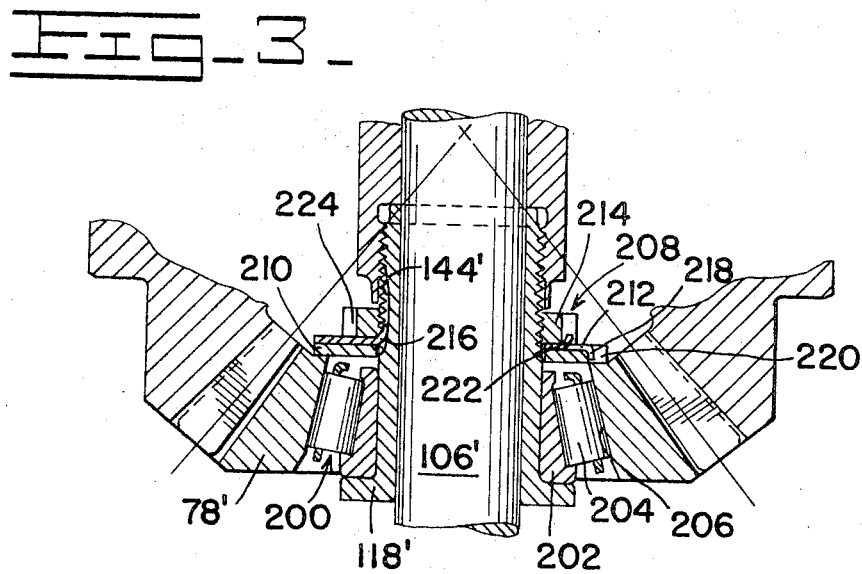
FIG-3-

DIFFERENTIAL GEAR ASSEMBLY

BACKGROUND OF THE INVENTION

The present invention relates to a differential gear assembly and more particularly to a differential gear assembly including a pinion assembly assuring proper meshing engagement between the pinion gears and a pair of driven bevel gears.

In the design and manufacture of differential gear assemblies, it has long been a problem to maintain proper engagement between various gear components, particularly between pinion gears and meshing bevel gears which are coupled to driven axle shafts. Close machining tolerances have generally been required along with relatively complicated mounting arrangements to maintain proper meshing engagement between the pinion gears and the driven bevel gears. Such close tolerances and complex assemblies may introduce even further problems because of the greater likelihood for machining and assembly errors during construction of the differential assembly. Improper meshing relation between gears in the differential assembly commonly results with unequal loading usually developing on the pinion gears and the driven bevel gears. Improper meshing between the gears causes problems of "backlash" and excessive wear leading to premature failure of the gear teeth and supporting bearings.

One of the more conventional solutions to this problem has been the employment of four pinion gears in the differential assembly, the four pinion gears each meshing with the two driven bevel gears for the purpose of avoiding excessive loading upon any one pinion gear. However, this solution has required an even more complex construction within the differential assembly, particularly in the design of a spider for carrying the four pinion gears.

SUMMARY OF THE INVENTION

Accordingly, it is an object of the present invention to provide a differential gear assembly which is of relatively simple design while serving to more accurately maintain proper meshing engagement between a pair of pinion gears and a pair of driven bevel gears.

It is a more particular object of the present invention to provide a pinion assembly within a differential gear assembly, the pinion assembly including adjustable means for establishing spacing between the pinion gears while providing for axial movement of the pinion assembly relative to the axes of the pinion gears, thus enabling the pinion gears to "float" in proper engagement with the driven bevel gears.

Additional objects and advantages of the present invention are made apparent in the following description having reference to the accompanying drawings.

DESCRIPTION OF THE DRAWINGS

FIG. 1 is a sectioned view of a differential assembly constructed according to the present invention in combination with an input pinion gear and a pair of axle shafts driven by the input gear through the differential gear assembly.

FIG. 3 is a similarly sectioned, fragmentary view of a portion of a differential gear assembly representing an alternate embodiment of the present invention.

DESCRIPTION OF THE PREFERRED EMBODIMENT

Figure 2:
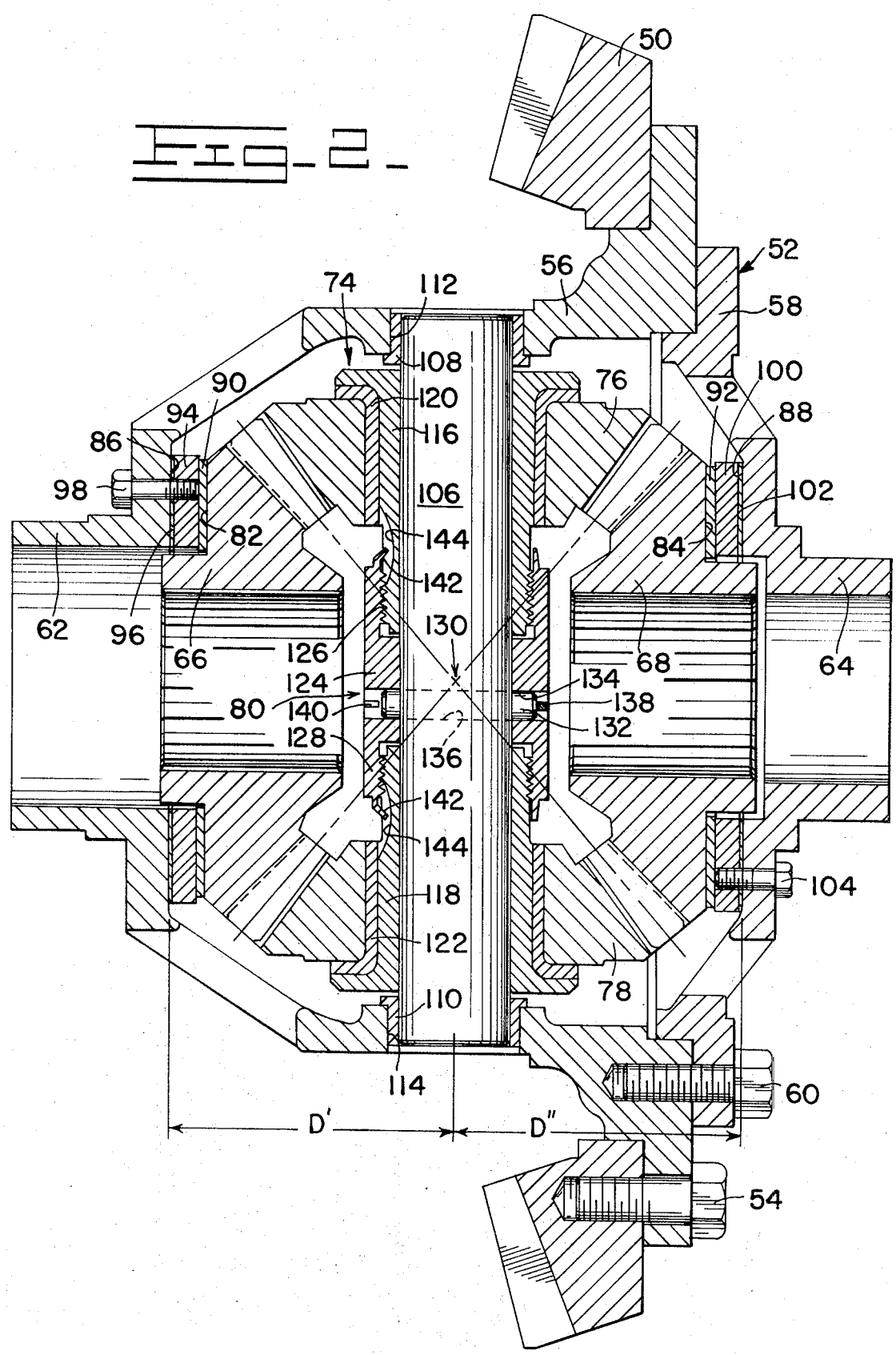
FIG. 2 is an enlarged view of the differential assembly of FIG. 1.

Referring particularly to FIG. 1, a differential gear assembly constructed according to the present invention is generally indicated at 10 for differentially coupling an input pinion gear 12 with a pair of driven axle shafts 14 and 16. The differential assembly 10 and input pinion 12 are both supported by a carrier assembly 18 including a housing 20. The housing 20 penetrates an opening 22 in axle housing 24 while being secured to the axle housing by a plurality of bolts such as that indicated at 26. A bearing assembly 30 is arranged within an internal bore 28 of the carrier housing to support the rotatable input pinion gear 12.

The carrier housing 20 also forms a pair of transverse openings 32 and 34 with bearing assemblies 36 and 38 being respectively arranged therein to support the differential assembly 10. The carrier housing 20 is preferably of generally conventional split construction to facilitate assembly of the differential gear assembly 10. Accordingly, end cap portions 40 and 42 are secured to the housing 20 by threaded nuts 44.

The bearing assemblies 36 and 38 each include a flanged bearing cage 46 which is internally threaded to receive a threaded adjusting ring 48. The adjusting rings 48 may accordingly be positioned to urge the bearing assemblies 36 and 38 into appropriate supporting engagement with the differential assembly 10.

The differential gear assembly 10, which is more clearly shown in FIG. 2, has a bevel ring gear 50 arranged in meshing engagement with the input pinion gear 12 (See FIG. 1). A differential housing 52 is secured to the ring gear 50 by a plurality of bolts such as that indicated at 54. The differential housing is preferably of two-piece construction, including a case portion 56 and a flange portion 58 which are secured together by a plurality of bolts such that as that indicated at 60. The case and flange portions of the differential housing respectively form axially aligned hub portions 62 and 64 which are respectively adapted for support by the bearing assemblies 36 and 38 (also see FIG. 1).

The differential housing 52 is particularly adapted to support bevel gears 66 and 68 which may be respectively coupled for driving engagement with the axle shafts 14 and 16 by means of splined interconnections indicated respectively at 70 and 72 (See FIG. 1). A pinion assembly 74 is also arranged within the differential housing 52 and its construction is a particularly important feature of the present invention. Generally, the pinion assembly 74 includes a pair of pinion gears 76 and 78, each arranged in meshing engagement with the output bevel gears 66 and 68. As discussed in greater detail below, the pinion assembly 74 includes adjustable means 80 for selectively establishing axial spacing between the pinion gears 76 and 78 while allowing limited movement of the assembled pinion gears the pinion gears in order to maintain accurate meshing engagement with the bevel gears 66 and 68.

The output bevel gears 66 and 68 have thrust surfaces 82 and 84 arranged in facing relation with internal thrust surfaces 86 and 88 formed by the differential housing 52 adjacent the hub portions 62 and 64. The bevel gears 66 and 68 are axially positioned relative to the thrust surfaces 86 and 88 by thrust bearings 90 and 92 which act directly upon the thrust surfaces 82 and 84 of the bevel gears 66 and 68. A hardened retaining plate 94 is arranged next to the bearing 90 with a shim arrangement 96 of selected thickness being disposed between the retaining plate 94 and the thrust surface 86 of the differential housing. The retaining plate 94 and shim arrangement 96 are positioned by a plurality of bolts penetrating the housing such as the one indicated at 98. Similarly, a hardened retaining plate 100 is arranged next to the bearing 92 with a shim arrangement 102 of selected thickness providing adjustable spacing between the hardened retaining plate 100 and the thrust surface 88. The retaining plate 100 and shim arrangement 102 are similarly positioned by a plurality of bolts such as that indicated at 104.

The bearings 90 and 92 serve to axially position the output bevel gears 66 and 68 while also allowing the bevel gears to experience at least limited radial movement. Further, the bearings 90 and 92 are adapted for rotation relative to both the thrust surfaces 82 and 84 as well as the hardened retaining plates 94 and 100. This arrangement has the purpose of reducing rotational velocity between the bearings and thrust surfaces.

The pinion assembly 74 includes a shaft 106 which is loosely supported at its ends by bushings 108 and 110, respectively, arranged in bores 112 and 114 formed by the differential housing case 56 in parallel alignment with the ring gear 50. Accordingly, the shaft 106 is supported for rotation with the differential housing 52 and the ring gear 50 while being free to "float" or experience limited axial movement.

The pinion gears 76 and 78 are mounted for rotation upon the shaft 106 by means of flanged support sleeves 116 and 118. Support bearings or bushings 120 and 122 are pressed into engagement with the pinion gears 76 and 78 while being rotatable upon the flanged support sleeves 116 and 118.

The adjustable means 80 includes a cylindrical coupling member 124 which is threaded at its ends 126 and 128 for adjustable engagement with the support sleeves 116 and 118. Accordingly, the position of the pinion gears 76, 78 may be adjusted by the threaded engagement of the sleeves 116, 118 with the cylindrical coupling 124 to preferably establish a common pitch cone center as indicated at 130 for both the pinion gears 76, 78 and the driven bevel gears 66, 68. The pitch cone center for the bevel gears 66, 68 is of course established by the selected thickness of the shim arrangements 96 and 102.

The cylindrical coupling 124 is axially secured upon the shaft 106 by means of a pin 132 which penetrates a cross-drilled passage 134 in the cylindrical coupling member and an aligned bore 136 radially formed in the shaft 106. The pin 132 is held in place by a split retaining ring 138 arranged in an annular groove 140 formed by the cylindrical coupling member 124.

The novel construction of the present invention is believed to be clearly demonstrated by the preceding description. However, novelty of the differential gear assembly 10 of FIGS. 1 and 2 is even more clearly demonstrated by the following description of an exemplary mode of assembly for the differential gear assemblies. The following description has particular reference to the arrangement or assembly of components within the differential housing 52.

Initially, the pinion assembly 74 is adjusted so that the pinion gears 76 and 78 have a common pitch cone center with the bevel gears 66 and 68. This may be accomplished by supporting the bevel gears 66 and 68 in an assembly fixture (not shown) with their pitch cone centers coinciding at a common pitch cone point such as that indicated at 130 in FIG. 2. The flanged sleeves 116 and 118 are then adjusted upon the cylindrical coupling member 124 to position the pinion gears 76 and 78 in axially spaced apart relation with their pitch cone centers corresponding with the point illustrated at 130 in FIG. 2. The flanged sleeves 116 and 118 are thus properly positioned to maintain the axial spacing between the pinion gears 76 and 78. They are then locked against further rotational movement relative to the coupling member 124 by staking deformable outer edges 142 at each end of the coupling member 124 into axially aligned slots formed in the sleeves 116 and 118 as indicated at 144.

As a separate phase of the assembly, respective dimension $D'$ and $D''$ are determined between the thrust surfaces 86, 88 of the differential housing and the axial center of the pinion assembly 74, as indicated in FIG. 2 at 130. These distances, of course, determine the preferred thicknesses for the shim assemblies 96 and 102. It is usually necessary to assemble the case 56 and flange 58 together to form the differential housing 52 in order to obtain these measurements.

With the thicknesses of the shim assemblies determined and the pinion assembly completed upon the shaft 106, the entire differential gear assembly 10 may then be finally completed. Preferably, the case portion 56 is positioned with the thrust surface 86 and the installed shim 96 and retaining plate 94 arranged horizontally and facing upwardly to receive the thrust bearing 90 and the bevel gear 66.

The pinion assembly 74 with the preadjusted cylindrical coupling member 124 and the support sleeves 116 and 118 is then arranged within the case 56 with the pinion gears 76 and 78 meshing with the bevel gear 66. The shaft 106 is inserted through the bearings 108 and 110 as well as the pinion assembly 74 with the pin 132 being arranged in the bores 134 and 136 and secured by the locking ring 138.

The other bevel gear 68 is then arranged in meshing engagement with the pinion gears 76 and 78. The flange portion 58 of the differential housing is installed after proper positioning of the bearing 92 and with the retaining plate 100 and shim arrangement 102 secured thereto.

With the assembly of the differential 10 completed, it is particularly important to note that the construction of the pinion assembly provides maximum axial spacing between the pinion gears 76 and 78, while allowing limited radial movement or "floating" action in the pinion gears so that they may remain in proper meshing engagement with the bevel gears 66 and 68. The mounting of the bevel gears 66 and 68 within the differential housing 52 is an additional preferred feature of the invention in that axial spacing between them may be adjusted while still allowing limited radial movement of the bevel gears. Accordingly, the bevel gears as well as the pinion gears may float or move radially during operation to maintain the common pitch cone center as indicated at 130 in FIG. 2.

Another embodiment of the invention is illustrated in FIG. 3. Numerous features of the FIG. 3 embodiment are substantially similar to components previously discussed in FIGS. 1 and 2. Accordingly, those similar components in FIG. 3 are identified by primed numerals identifying the same components in FIGS. 1 and 2.

The FIG. 3 embodiment differs from the embodiment of FIGS. 1 and 2 mainly in the bearing means supporting the pinion gears 76' and 78' for rotation relative to the shaft 106'. In particular, the bushing 122 of FIG. 2 is replaced by a roller bearing assembly 200 in the FIG. 3 embodiment. Only the bearing arrangement for the pinion gear 78' is illustrated in FIG. 3. However, a similar bearing support is contemplated for the other pinion gear 76' (not shown).

The roller bearing assembly 200 includes an inner race or cone 202 supporting a plurality of tapered roller bearings 204. The pinion gear 78' includes a tapered bore 206 which acts as an outer race or cup for the roller bearings. Accordingly, the bearing construction of FIG. 3 is particularly economical since the outer race is provided by the pinion gear and a bearing cup is not required.

A bearing adjustment assembly 208 associated with the bearing assembly 200 includes a retaining plate 210, a lock 212 and a nut 214 which are used to limit axial spacing between the pinion gear 78' and the flanged sleeve 118' which supports the inner race 202. A first tang 216 on the lock member 212 is urged into the slot 144' formed in the sleeve 118'. A second tang 218 is urged into a slot 220 formed in the retaining plate 210. The nut 214 is then properly positioned in threaded engagement upon the sleeve 118' to establish desired axial spacing for the bearing assembly 200. To maintain that axial spacing, a third tang 222 is then urged into one of a plurality of slots 224 formed in the nut 214.

What is claimed is:

1. A differential gear assembly for differentially coupling an input shaft with a pair of driven axle shafts, comprising
    a ring gear arranged in rotatable engagement with the input shaft,
    a differential housing secured for rotation with the ring gear and forming openings on opposite sides thereof in axial alignment with the ring gear for receiving the axle shafts,
    bevel gears respectively secured for rotation with the axle shafts,
    bearing means interacting between each bevel gear and the housing around the respective openings to provide selected spacing between the bevel gears and to allow movement of the bevel gears relative to the housing, and
    a pinion assembly including a pair of pinion gears each arranged in meshing engagement with the bevel gears, a shaft supporting the pinion gears and mounted on the housing by bushing means permitting limited movement of the pinion assembly, adjustable means being mounted on the shaft for securing the pinion gears in selected spaced apart relation.

2. The differential assembly of claim 1 further comprising a hardened annular retaining plate and shim means of selected thickness arranged between the bearing means and an annular surface on the housing.

3. The differential gear assembly of claim 2 wherein the pinion assembly further includes a flanged sleeve arranged toward each end of the shaft, the pinion gears being respectively supported upon the flanged sleeves by bearing means, the adjustable means comprising a cylindrical member arranged generally at the longitudinal center of the shaft and threadably engaging the flanged sleeves.

4. The differential gear assembly of claim 1 wherein the pinion assembly further includes a flanged sleeve arranged toward each end of the shaft, the pinion gears being respectively supported upon the flanged sleeves by bearing means, the adjustable means comprising a cylindrical member arranged generally at the longitudinal center of the shaft and adapted for threaded engagement with the flanged sleeves.

5. A differential gear assembly for differentially coupling an input shaft with a pair of driven axle shafts, comprising
    bevel gears respectively secured for rotation with the axle shafts,
    a housing rotatably supporting the bevel gears by means of bearings, the housing and bearings establishing the axial spacing between the bevel gears while allowing relative radial movement of the bevel gears,
    a pinion assembly including a pair of pinion gears each arranged in meshing engagement with the bevel gears and adjustable means for securing the pinion gears in spaced apart relation.
    a ring gear engaged with the input shaft, and
    means securing the pinion assembly for rotation with the ring gear while allowing limited movement of the pinion assembly whereby a common pitch cone center may be established and more accurately maintained for the meshing pinion gears and bevel gears during operation of the differential gear assembly.

* * * * *